UNITED STATES PATENT OFFICE 1,996,003

PRODUCTION OF HYDROXY-ALKYL COMPOUNDS

Heinrich Dehnert, Oggersheim, and Willi Krey, Uerdingen, Germany, assignors to I. G. Farbenindustrie Aktiengesellschaft, Frankfort-on-the-Main, Germany No Drawing. Application February 28, 1931, Serial No. 519,247. In Germany March 13, 1930

10 Claims. (Cl. 260—128)

The present invention relates to the production of hydroxy-alkyl compounds.

It is well known that hydroxy-alkyl compounds can be obtained by acting with alkylene oxides on organic compounds containing reactive hydrogen atoms connected to acyclic hetero atoms selected from the group consisting of oxygen and nitrogen atoms i. e. on alcohols, such as aliphatic, cycloaliphatic or aliphatic aromatic alcohols or phenols, or on primary or secondary amines or carboxylic acids, the reaction being accelerated in many cases by an addition of a small quantity of an acid such as sulphuric acid. Catalysts of this nature are, however, difficultly removed from the reaction products.

We have now found that this process may be carried out in a particularly advantageous manner by employing acidified hydrosilicates as the catalysts. Generally speaking it is preferable to work at elevated temperatures, as for example at temperatures between about 40° and 200° C., the temperatures of working with alcohols being usually between about 40° and 100° C., aliphatic primary and secondary amines and carboxylic acids of low molecular weight reacting in many cases at still lower temperatures. The hydrosilicates, in particular aluminium hydrosilicates, which are known in commerce under various names (see Kausch, "Das Kieselsäuregel und die Bleicherden" 1927, pages 176 and 177) are acidified by a treatment with strong acids such as hydrochloric, sulphuric, phosphoric or formic acids, and then employed directly as catalysts for the process according to the present invention. The activation is preferably carried out so that a product is obtained which when dispersed in water furnishes a pH value of less than 3, preferably between 1.5 and 2.0. This acidification may consist for example in allowing aqueous solutions of the said acids, as for example hydrochloric acid, to act on the hydrosilicates, the latter then being separated and dried at about from 100° to 150° C. depending on the quantity of acid desired to remain on or in the single particles of the silicate; a similar regulation of the acidity can be obtained by a prolonged rinsing with water. Some of the commercial products already have a favourable content of acid and can therefore be employed without further treatment, such as "Tonsil AC" or "Frankonit F".

The advantage derived by these hydrosilicates over the catalysts already known consists in the fact that they enable the operation to be performed under very mild conditions and therefore furnish purer products direct, and also that they can be separated in a convenient manner on the completion of the reaction without the necessity of any neutralization, followed by the separation of deposited salts which was necessary in the case of the acids or alkali compounds hitherto usually employed.

Primary, secondary and tertiary alcohols can be thus easily converted into their hydroxy-alkyl ethers, primary or secondary amines into hydroxy-alkyl amines and carboxylic acids into hydroxy-alkyl esters. For example the process may be carried out in practice by leading the alkylene oxide into a preheated alcohol, which is preferably present in excess to the quantity required for the production of mono-ethers and in which the catalyst is suspended, while stirring well. The alkylene oxide is then immediately converted, and this may be detected by a rise in the temperature of the mixture. If desired, the process may be carried out continuously and/or in a closed vessel and if desired at a pressure above atmospheric pressure.

After the reaction is completed, the catalysts are separated from the reaction mixture by filtration, and the glycol mono-alkyl ether formed is separated from the reaction mixture by fractional distillation. The simultaneous formation of poly-glycol ethers, which are frequently formed in undesirably large amounts by the conversion of alkylene oxides with alcohols, is to a large extent avoided by employing the acidified hydrosilicates as the catalysts.

The process according to the present invention has the special advantage that not only is a rapid and safe conversion into glycol monoalkyl ethers possible, but also, after simply separating the catalyst, a liquid reaction product is directly obtained which contains practically no more extraneous substances, such as sulphuric acid hitherto employed as a catalyst, and can therefore be subjected to fractional distillation without further treatment. Besides this it allows of obtaining hydroxy-alkyl ethers of secondary or tertiary alcohols which could be hitherto prepared only with difficulties or with bad yields.

The following examples will further illustrate the nature of this invention, but the invention is not restricted to these examples. The parts are by weight.

*Example 1*

500 parts of ethyl alcohol are heated to boiling while stirring with 25 parts of "Tonsil AC" (see Kausch, l. c. pages 176 and 177) which has been dried at 150° C. and shows with water a pH value of about 2.3. Then during the course of 90 minutes 98.6 parts of ethylene oxide are led into the liquid at such a rate that the temperature continually rises (from 79° to 82° C.). After leading in the ethylene oxide the whole is preferably kept boiling for a quarter of an hour, the cooled and filtered solution then being fractionally distilled. The conversion of ethylene oxide is practically quantitative. Yields of over 80 per cent of ethylene glycol mono-ethyl ether, calculated with reference to the ethylene oxide employed, are obtained by the fractional distillation. The remainder of the ethylene oxide has been mainly used up in the formation of poly-ethyleneglycol ethers.

Example 2

1400 parts of ethyl alcohol and 70 parts of finely divided "Frankonit S" (see Kausch, l. c.) each part of which has been treated with 2 parts of 18 per cent aqueous hydrochloric acid and dried at 130° C., are heated while stirring well. 268.8 parts of ethylene oxide are led into the boiling liquid during the course of 2½ hours in the manner described in Example 1 and then the whole is kept boiling for a further 25 minutes and worked up as hereinbefore described. The yield of ethylene glycol mono-ethyl ether amounts to 85 per cent and more. The catalyst after being filtered off and washed with ethyl alcohol may advantageously be employed again several times without drying and activating treatment. The same results are obtained by commencing leading in the ethylene oxide at 25° C. and slowly raising the temperature to the boiling point.

Example 3

960 parts of methanol are heated to boiling with 5 per cent of the finely divided catalyst specified in Example 2. 251 parts of ethylene oxide are then led in during the course of 165 minutes, the temperature thereby rising from 66° to about 70° C., and after boiling for a further quarter of an hour to about 71° C. The whole is worked up as described in Example 1. The yield of ethylene glycol mono-methyl ether amounts to about 85 per cent.

Example 4

116 parts of α-propylene oxide are allowed to drop during the course of 90 minutes at about 78° C. into 500 parts of ethyl alcohol to which 25 parts of "Frankonit F" (see Kausch, l. c.) have been added. The temperature rises to about 83° C. and when the whole has been kept boiling for a short time after the introduction of the whole of the propylene oxide the temperature rises to about 85° C. The α-propylene glycol mono-ethyl ether is obtained in a yield of about 85 per cent.

Example 5

50 parts of ethylene oxide are passed, at from 120° to 130° C., into 200 parts of phenol containing 10 parts of "Tonsil AC" in suspension. After filtration, 135 parts of ethylene glycol mono-phenyl ether and a small quantity of products of higher boiling point are obtained on distilling the filtrate.

Example 6

870 parts of ethylene oxide are introduced into 930 parts of aniline containing 20 parts of "Tonsil AC" in suspension and heated to from 100° to 130° C. The reaction product consists almost exclusively of di-hydroxylethyl aniline. With the aid of 20 parts of "Tonsil AC" and with a temperature of 130° to 150° C., 1000 parts of n-butylaniline and 205 parts of ethylene oxide furnish 895 parts of N-hydroxy-ethyl butylaniline together with unaltered mono-butylaniline and a very small amount of residue.

Example 7

270 parts of para-aminophenol distributed in 500 parts of xylene and mixed with 20 parts of the silicate known under the registered trademark "Frankonit KL" (see Kausch, "Das Kieselsäuregel und die Bleicherden" 1927, page 200), furnish, when 215 parts of ethylene oxide are introduced at from 120° to 140° C., di-hydroxyethyl para-aminophenol

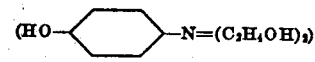

which is obtained in a pure state by recrystallization from butanol.

Example 8

184 parts of benzidine are suspended in 400 parts of xylene heated to 120° C., and, after the addition of 20 parts of "Frankonit KL", 180 parts of ethylene oxide are added. After cooling, the solid reaction product is separated from the solvent and purified by recrystallization from butanol. It consists of tetrahydroxyethyl benzidine, melting at from about 158° to 159° C.

Example 9

Vapours of 100 parts of ethylene oxide are passed in the course of three hours at 130° C. through 298 parts of mono-n-butyl aniline which have been mixed with 10 parts of "Frankonit KL". After filtration and distillation 310 parts of N-hydroxy ethyl, N-n-butyl aniline

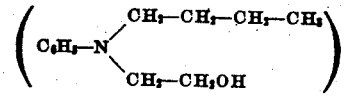

are obtained together with 35 parts of unaltered mono-n-butyl aniline. Without the addition of the activated hydrosilicate the yield is about one half that stated, even when heating to 150° C. for 6 hours, and an addition of 3 parts of formic acid does not considerably alter this result.

Example 10

1400 parts of butylene oxide (a mixture of the isomers) are slowly introduced at 55° C. into a mixture of 4000 parts of ethyl alcohol and 30 parts of the hydrosilicate "Tonsil AC" while stirring. As soon as no unaltered butylene oxide is present the silicate is filtered off and the liquid is subjected to distillation, whereby 1650 parts of butylene glycol mono-ethyl ether, 300 parts of di-butylene glycol mono-ether, 125 parts of poly-butylene glycol mono-ethyl ether and 3200 parts of unaltered ethyl alcohol are obtained.

Example 11

1400 parts of secondary propyl alcohol ($CH_3$—CHOH—$CH_3$) are mixed with 28 parts of the hydrosilicate "Tonsil AC" and 175 parts of gaseous ethylene oxide are introduced as quickly as possible into the mixture heated to its boiling point while stirring and allowing the temperature to rise to about 85° C. After filtering the reaction product ethylene glycol mono-isopropyl ether having a boiling point of from 141° to 142° C. is obtained by distillation in a yield of about 84 per cent of the theoretical yield.

Example 12

875 parts of secondary propyl alcohol are mixed with 26.25 parts of the hydrosilicate "Tonsil AC" and 175 parts of propylene oxide are gradually introduced while stirring and heating the reaction mixture from 80° to 86° C. After heating under reflux for a short time the reaction mixture is filtered and the solution is subjected to distillation. Propylene glycol mono-isopropyl ether having a boiling point of from 144° to 145° C. is obtained in a yield of about 83 per cent of the theoretical yield.

Example 13

26.25 parts of the product obtainable by mixing the bleaching earth traded under the registered trade-mark "Frankonit S" with hydrochloric acid and drying the mixture in vacuo at 120° C., are added to 875 parts of secondary butyl alcohol ($CH_3-CH_2-CH(OH)-CH_3$), whereupon 175 parts of ethylene oxide are introduced into the mixture heated to its boiling point. The reaction temperature is allowed to rise from about 99° to about 104° C. After filtering off the catalyst ethylene glycol mono-butyl ether having a boiling point of from 157° to 158° C. is obtained in a yield of about 70 per cent of the theoretical yield. In the same manner the glycol ether of tertiary butyl alcohol (($CH_3)_3-COH$) can be obtained which boils at from 150° to 153° C.

Example 14

1225 parts of ethylene chlorhydrin are mixed with 25.5 parts of the hydrosilicate "Tonsil AC" dried in vacuo at 120° C. While stirring at 125° C. 175 parts of ethylene oxide are introduced and the reaction temperature is allowed to rise gradually to 130° C. After filtration the liquid is distilled in vacuo, whereby ethylene glycol mono-2-chlorethyl ether having a boiling point of from 93° to 96° C. at 11 millimetres mercury is obtained in a yield of 65 per cent of the theoretical yield.

What we claim is:—

1. In the production of hydroxy-alkyl compounds from an organic compound, containing a reactive hydrogen atom connected to an acyclic hetero atom selected from the group consisting of oxygen and nitrogen atoms, and an alkylene oxide, the improvement which comprises carrying out the reaction in the presence of an acidified hydrosilicate.

2. In the production of hydroxy-alkyl compounds from an organic compound, containing a reactive hydrogen atom connected to an acyclic hetero atom selected from the group consisting of oxygen and nitrogen atoms, and an alkylene oxide, the improvement which comprises carrying out the reaction in the presence of an acidified aluminium hydrosilicate.

3. In the production of hydroxy-alkyl compounds from an organic compound, containing a reactive hydrogen atom connected to an acyclic hetero atom selected from the group consisting of oxygen and nitrogen atoms, and an alkylene oxide, the improvement which comprises carrying out the reaction in the presence of an acidified hydrosilicate giving, with water, a hydrogen-ion concentration value below 3.

4. In the production of hydroxy-alkyl compounds from an alcohol and an alkylene oxide, the improvement which comprises carrying out the reaction in the presence of an acidified aluminium hydrosilicate.

5. In the production of hydroxy-alkyl compounds from a phenol and an alkylene oxide, the improvement which comprises carrying out the reaction in the presence of an acidified aluminium hydrosylicate.

6. In the production of hydroxy-alkyl compounds from an amine, containing a reactive hydrogen atom connected to an acyclic nitrogen atom, and an alkylene oxide, the improvement which comprises carrying out the reaction in the presence of an acidified aluminium hydrosilicate.

7. In the production of hydroxy-alkyl compounds from an aromatic amine, containing a reactive hydrogen atom connected to an acyclic nitrogen atom, and an alkylene oxide, the improvement which comprises carrying out the reaction in the presence of an acidified aluminium hydrosilicate.

8. In the production of hydroxy-alkyl ethers of aliphatic alcohols from an aliphatic alcohol, and an alkylene oxide, the improvement which comprises carrying out the reaction in the presence of an aluminium hydrosilicate containing a small quantity of hydrochloric acid.

9. In the production of hydroxy-alkyl ethers of non-primary aliphatic alcohols from a non-primary aliphatic alcohol, and an alkylene oxide, the improvement which comprises carrying out the reaction in the presence of an acidified aluminium hydrosilicate.

10. In the production of ethylene glycol mono-ethyl ether from ethyl alcohol and ethylene oxide, the improvement which comprises carrying out the reaction in the presence of an aluminium hydrosilicate containing a small quantity of hydrochloric acid.

HEINRICH DEHNERT.
WILLI KREY.